United States Patent [19]
Sayegh

[11] Patent Number: 5,333,229
[45] Date of Patent: Jul. 26, 1994

[54] ASYMMETRICAL POLARIZATION-MAINTAINING OPTICAL WAVEGUIDE AND PROCESS FOR MANUFACTURE THEREOF

[75] Inventor: Emile G. Sayegh, Austin, Tex.

[73] Assignee: W. L. Gore & Associates, Inc., Newark, Del.

[21] Appl. No.: 40,694

[22] Filed: Mar. 31, 1993

[51] Int. Cl.$^5$ .............................. G02B 6/44
[52] U.S. Cl. ....................... 385/102; 385/11; 385/128
[58] Field of Search .............. 385/11, 102, 114, 113, 385/128, 107, 142-146

[56] References Cited

U.S. PATENT DOCUMENTS

| | | | |
|---|---|---|---|
| 4,753,497 | 6/1988 | Fujii et al. | 385/11 X |
| 4,818,047 | 4/1989 | Takuma et al. | 385/11 X |
| 5,002,359 | 3/1991 | Sayegh | 385/107 |
| 5,182,785 | 1/1993 | Sayegh et al. | 385/128 |
| 5,189,721 | 2/1993 | Sayegh et al. | 385/114 |
| 5,201,020 | 4/1993 | Kannabiran | 385/113 |

Primary Examiner—Rodney B. Bovernick
Assistant Examiner—Phan Thi Heartney

[57] ABSTRACT

An asymmetrically shaped signal polarization maintaining optical waveguide including an asymmetrically shaped optical fiber surrounded by glass cladding, hard polymer coating, soft porous polymer buffering layer, porous polymer laminate inner layer, polyester laminate outer layer bearing tabs oriented to an axis of asymmetry of the optical fiber, braid fiber sheath, and outer jacket, the observable tab orientation on the outside of the cable providing location means of the axis of asymmetry of the optical fiber.

9 Claims, 3 Drawing Sheets

ASYMMETRICAL POLARIZATION-MAINTAINING OPTICAL WAVEGUIDE AND PROCESS FOR MANUFACTURE THEREOF

FIELD OF THE INVENTION

The invention relates to optical waveguides which are used to propagate electromagnetic waves of the waveband used for optical signals in communications systems, particularly those waveguides used to carry polarized waves through asymmetrical optical fibers.

BACKGROUND OF THE INVENTION

Two mutually orthogonally polarized modes are able to propagate in single mode symmetrical dielectric waveguides. When the cross-section of the waveguide is perfectly circular, the two modes maintain the same phase. Thus, no differences in phase occurs between the two waves, allowing the wave to maintain its original polarity.

Optical fibers {dielectric waveguides}having cores of elliptical cross-section are well known to have good polarization holding properties when the difference between the refractive indices of the fiber core and cladding are relatively large. This large difference in refractive index between core and cladding maximizes the difference between the propagation constants of the two fundamental modes of a signal propagated along the major and minor axes of the elliptical cross-section and also minimizes the coupling of the two fundamental modes. This results in reliable pickup of an optical wave signal band through the fiber in the fundamental mode having an electric field parallel to the major axis of the ellipse at the opposite end of the fiber.

In practice however, it is difficult to attain perfect alignment of the wave source and the major axis of the fiber. Instead of single mode propagation along the major axis of the ellipse, the wave is propagated in two orthogonally polarized fundamental modes aligned with both the major and minor axes of the ellipse. The elliptical configuration of the optical fiber tends to hold these two fundamental modes in alignment with these axes throughout the length of the fiber.

It is also known, as shown in U.S. Pat. No. 4,307,938 (Dyott), that unwanted higher order modes are cut off in the region of maximum difference between the orthogonally polarized fundamental propagation modes in elliptical cored optical fibers. Even accidental coupling between the two fundamental modes will reduce the useful band width of the fiber or wave guide. A fiber having a core of elliptical cross-section could be provided in which there was excellent preservation of the polarization of the transmitted signal through the fiber in the operating region in which high order modes of the signal are cut off, but the group velocities of the two fundamental modes of the transmitted signal were equal. This equality of group velocities renders insignificant any disturbances which otherwise would occur from accidental coupling of the two fundamental modes.

Such polarization-maintaining fibers are useful for making physical measurements by the interference of two coherent beams of light; for fiber sensors in which the difference in propagation of one of the orthogonal polarizations is subjected to a property being measured, such as a magnetic field or pressure, and compared to another reference fiber beam; or in heterodyne communications the transmission of signals separately on each of the orthogonal modes in order to increase signal carrying capacity.

The benefits of maximizing the geometrical portion of the birefringence of light by use of a non-circular core shape as discussed above may alternatively be obtained by maximizing the material birefringence obtained by inducing strain in the fiber.

It is known that optical fibers with non-circular cores are much more sensitive to pressure than other optical fibers. This invention addresses the problem of isolating non-circular optical fibers from such pressure and at the same time provides a means to know the orientation of the axis of asymmetry of the optical fiber at the center of the cable from an indicator asymmetry of the outside of the cable.

SUMMARY OF THE INVENTION

The invention comprises an asymmetrical polarization-maintaining optical waveguide. The waveguide comprises a fiber core having an asymmetrical cross-section of optical glass or silica clad with a glass or silica having a refractive index lower than that of the fiber core. The cladding is coated by a hard polymer. A softer layer of porous polymer surrounds the clad and coated fiber, the preferred porous polymer being expanded polytetrafluoroethylene (ePTFE), which is that disclosed in U.S. Pat. Nos. 3,953,566, 3,962,153, 4,096,227, 4,187,390, 4,902,423, and 4,478,665, assigned to W. L. Gore & Associates, Inc. Relatively soft porous forms of the polymer are preferred to inhance the protection of the optical fiber, which may have a core that is ellipsoidal in cross-section.

Surrounding the ePTFE layer is a laminate of ePTFE and polyester sheets, the polyester side outward. The laminate layer has on its outer polyester surface protuberances or "ears" which are aligned in known relationship with an axis of asymmetry of the asymmetrically shaped optical fiber core. These protuberances are precisely aligned in relation to the axis of asymmetry of the core during and as a result of the manufacturing process of the waveguide.

Optionally covering and protecting the laminate covered waveguide is a braided fiber jacket of high-strength polymer fibers.

Optionally surrounding the braided jacket is a protective outer jacket of extruded or tape-wrapped polymer.

The waveguide of the invention is manufactured by typical cabling processes and machining used in the art. Several carefully aligned clad and coated optical fiber waveguides are passed between grooved guide rolls between two sheets of laminate into the nip of heated pressure rolls. The waveguides have a known axis of asymmetry precisely aligned as they pass into the nip of the rollers. The sheets of laminate have a layer of ePTFE or other soft porous polymer adjacent the waveguides and an outer layer of polyester or resin of similar thermoplastic properties. The nip of the heated rollers presses and forms the laminate about the waveguides, the ePTFE layer usually being pinched out of the web formed between adjacent waveguides. After cooling, the webs between the waveguides are slit to leave separate waveguides having carefully aligned protuberances (or "ears") on each side which are precisely aligned in relation to a known axis of asymmetry of the optical fiber therein, such at 90° or 180° to that axis.

Leaving the ears on, a sheath of braid strong polymer fibers to provide linear strength to the waveguide may now be braided around the waveguide.

The sheathed waveguide may be further jacketed for environmental protection by an extruded or tape-wrapped jacket of thermoplastic polymer.

The alignment problem during termination of an asymmetrical polarization-maintaining optical waveguide may thus be readily solved by noting the outer asymmetry of the waveguide and considering the known relationship of the outer asymmetry of the waveguide to an axis of asymmetry of the optical fiber within the waveguide. A successful termination of the waveguide may be accomplished with the polarization of a transmitted wave through the fiber being maintained.

DETAILED DESCRIPTION OF THE INVENTION

The cable of the invention is now described with reference to the figures to more carefully delineate the details of and materials useful in the invention.

Figure 1:
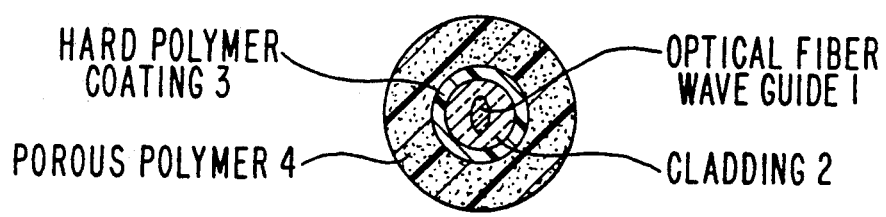
FIG. 1 is a cross-sectional view of an optical waveguide surrounded by a porous polymer layer.

FIG. 1 shows an optical waveguide fiber surrounded by a porous polymer layer 4, preferably of ePTFE, as described above. The optical waveguide fiber 1 is of an elliptical cross-sectional configuration, but may have other useful irregular configurations which will have good polarization retaining properties. Fiber 1 may be of glass or silica and is surrounded by a cladding 2 of a glass or silica layer of lower refracture index. The clad fiber is provided with a hard polymer coating 3 to protect the underlying layers from physical damage which might affect the light-transmission properties of the fiber. A hard polymer coating may comprise epoxy, polyimide, polyether ether ketone, polypropylene, or full density PTFE, for example. A porous polymer layer 4 surrounds the hard polymer coating 3 to provide a resilient protective buffering layer against damage to the cable caused by bending, pressure, or blows to the cable.

Figure 2:
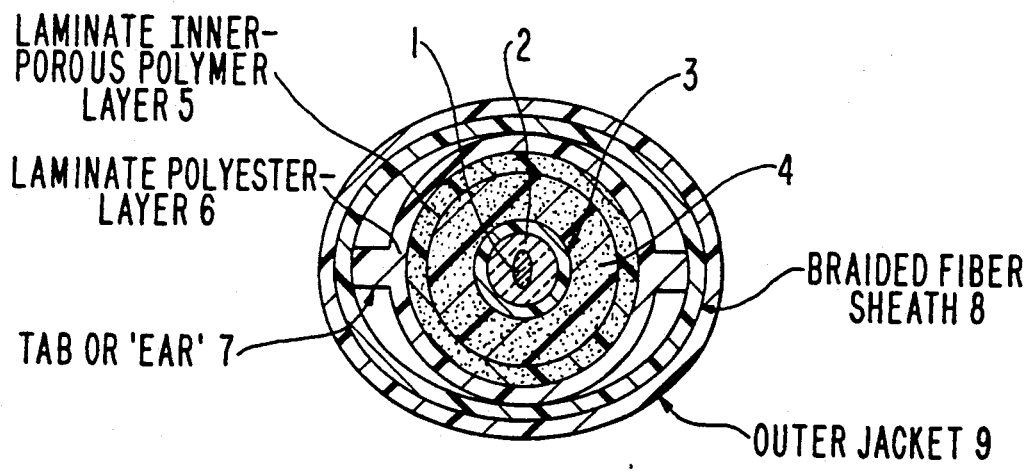
FIG. 2 is a cross-sectional view of a cable of the invention including all required and optional layers.

FIG. 2 describes a cross-section of a cable of the invention wherein a cable core, such as that shown in FIG. 1 is surrounded by layers of porous polymer, polyester, a braided fiber sheath, and an outer protective polymer jacket.

One or more cable cores are sandwiched between two sheets of polymer laminate in which a sheet of porous polymer 5, such as ePTFE, for example, is laminated to a sheet of polyester 6, the porous polymer, layer 5 forming the inside of the laminate adjacent the cable core(s). The cores and sheets of laminate are passed together through the nip of heated grooved pressure rolls to force the laminate around and between the cores, the inner porous layer 5 of the laminate being essentially squeezed out from between the laminate sheets in the connecting web portions of polyester 6 between the enshrouded optical waveguide fibers. After cooling, the webs are slit apart to leave individual waveguide fibers which have protuberant tabs 7 or "ears" on opposite sides, which are the residue of the webs after the slitting operation. It is preferred that tabs 7 be aligned with the major axis of the elipse of the core fiber. The alignment of the core axis is maintained by tilting the feed reel into the rolls if necessary or by re-reeling an elliptical core on a reel in proper configuration such that it will feed into the rolls in the desired alignment.

At this stage, the waveguides are passed through a sheath braiding machine and a braided polymer fiber sheath 8 braided around the waveguide. Useful fibers to form such a braid are strong fibers of polyamide, aromatic polyester, or polyamide-imide or the like, for example.

The braided sheath-enclosed waveguide may now be covered with an environmentally protective polymer jacket, which is usually extruded onto the waveguide but may be tape-wrapped if desired, particularly if a thermosetting polymer jacket is desired, such as of polyimide polymer tape. More often, a thermoplastic polymer will be used, such as polyvinyl chloride, urethane rubber, polypropylene, polyethylene, polyester, rubber, and fluorinated polymers, for example.

Figure 3:
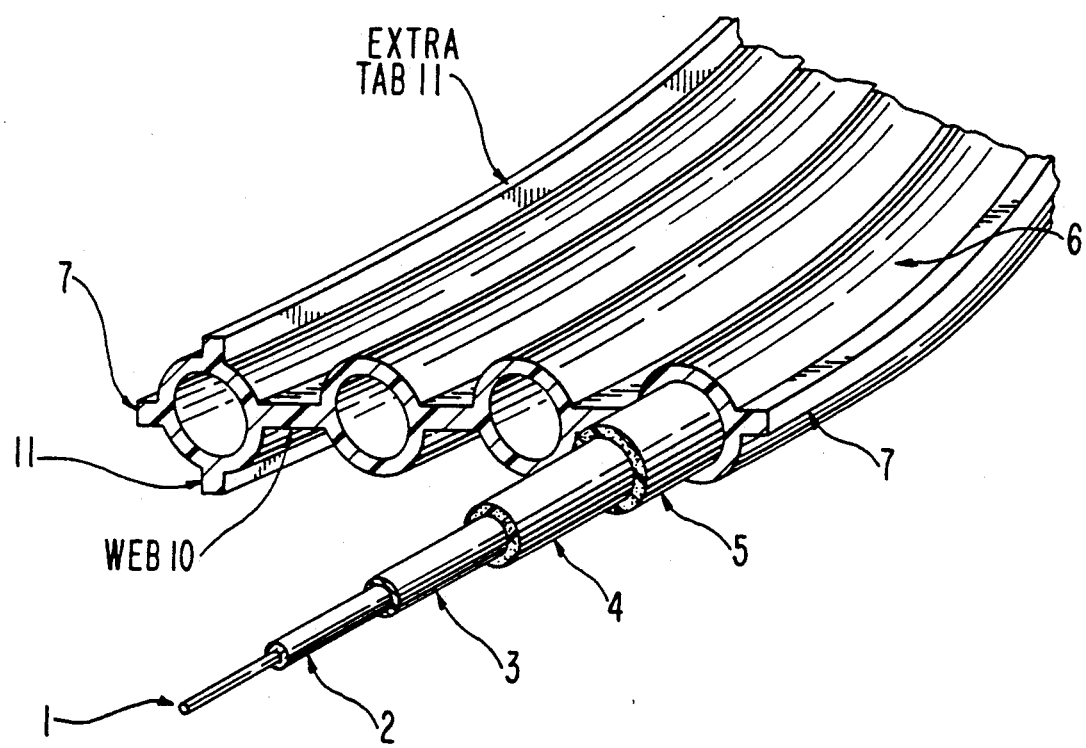
FIG. 3 is a perspective view of a cable of the invention with some layers cut away to illustrate the structure of the cable.

FIG. 3 depicts a cable of the invention at the stage of manufacture wherein the cable cores have been sandwiched between ePTFE-polyester laminates and passed between the nip of heated grooved rolls to form the polyester webs 10 between the waveguides. An extra set of protuberant tabs 11 is shown which were optionally formed by appropriately shaped rolls at that point on the cable from the polyester layer 6 of the laminate. One of the optical waveguides is shown with the layers cut away so the layers can be easily seen. Non-round optical fiber 1 is clad by a glass or silica material 2 of lower index of refraction than fiber 1. Cladding 2 is surrounded by hard polymer coating 3 and in turn by porous polymer 4 and porous polymer inner layer 5 of the laminate of which polyester layer 6 forms the outer layer.

Figure 4:
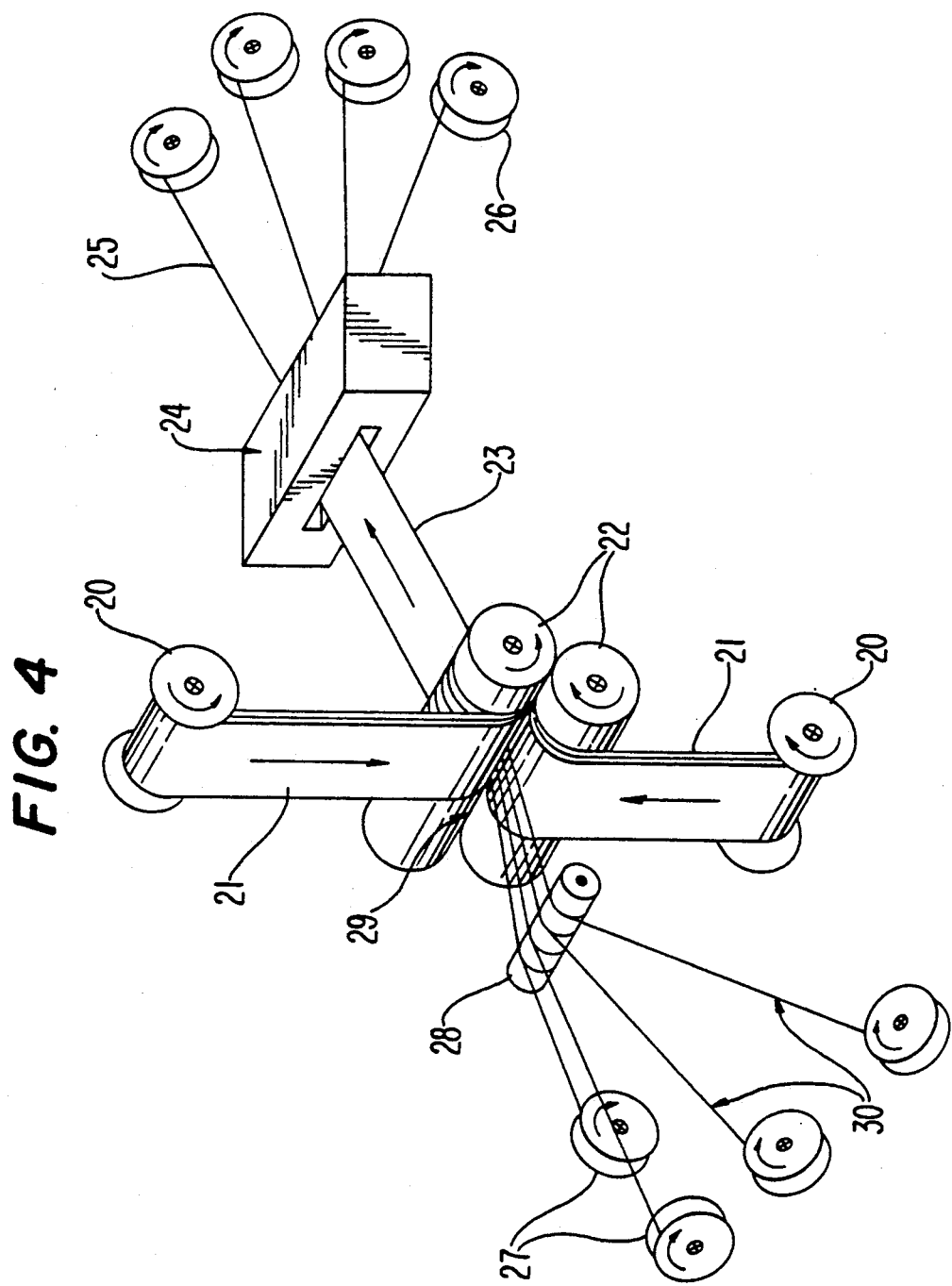
FIG. 4 is a perspective schematic view of a process for manufacture of a cable of the invention.

FIG. 4 provides a perspective schematic view of a manufacturing process which may be used to form a cable of the invention. An optical waveguide fiber 1 core 30 with cladding 2 and hard polymer coating 3 is supplied from reels 27 over a grooved alignment roll 28 to the nip 29 between heated pressure rolls 22. Also passing into nip 29 of rolls 28 are two sheets of porous polymer-polyester laminate from supply reels 20, porous polymer facing cores 30, and on each side of cores 30. Exiting rolls 22 is the flat cable formed from the cores and two laminate sheets which passes into means 24 to cool the flat cable and slit it apart into tabbed insulated single waveguides 25. These waveguides may be coiled onto take up reels 26 for subsequent further manufacturing steps or may be passed individually into a braiding machine and then an extruder (or tape wrapper) for application of the protective polymer braided fiber sheath 8 and outer jacket 9.

The waveguides of the invention provide a solution to the problem of the effects of pressure on asymmetrically shaped optical fiber waveguides, which are more resistive to pressure than other forms of waveguides, by completely isolating them from the outside environment and pressure from without. The tabs formed on the outside and observable thereon are oriented with respect to an axis of the asymmetrical optical fiber so that the orientation of the fiber can be easily maintained during handling, installation, and termination.

I claim:

1. An asymmetrically shaped signal polarization-maintaining optical waveguide, said waveguide comprising in order from inside to outside:
   (a) a shaped glass optical fiber waveguide core having an asymmetrical cross-section, said asymmetrically shaped optical fiber core coated with a classing and a hard polymer coating surrounding said cladding;
   (b) a layer of porous polymer surrounding said cladding and said hard polymer coating; and
   (c) a layer of laminated polyester-porous polymer film, said polyester layer of said laminated film forming the outer layer thereof, said laminated layer having protuberances on the outer surface thereof aligned in known relationship to an axis of said asymmetrically shaped optical fiber core.

2. A waveguide of claim 1 wherein said porous polymer therein comprises expanded polytetrafluoroethylene.

3. A waveguide of claims 1 or 2 surrounded by a braided jacket of high-strength polymer fibers.

4. A waveguide of claim 3 surrounded by a protective outer jacket.

5. A waveguide of claim 3 wherein said high-strength polymer fibers are selected from the group consisting of polyester, polyamide, polyimide-amide, polyimide, and aromatic polyester.

6. A waveguide of claims 1 or 2 wherein said polyester layer comprises polyethylene terephthalate.

7. A process for manufacture of an asymmetrical optical waveguide comprising the steps of:
   (a) surrounding an asymmetrical glass or silica optical waveguide fiber, clad with glass or silica and a hard polymer coating on said glass or silica cladding, with a resilient layer of porous polymer;
   (b) placing more than one said spaced apart clad and coated asymmetrical fiber in known alignment of an axis of asymmetry of the fibers between layers of polyester-porous polymer laminate, polyester side outward;
   (c) passing said laminate and axis-aligned fibers between heated shaped pressure rolls to form said laminate around and between said fibers;
   (d) after cooling said formed laminate, slitting apart the axis-aligned fibers to leave protuberances of laminating material extending from said fibers in known relationship to the axis of asymmetry of said fibers.

8. A process of claim 7 including the additional step of braiding a jacket of high-strength polymer fibers around said waveguide.

9. A process of claim 8 including the additional step of surrounding said braided jacket with a protective outer jacket.

* * * * *